(12) United States Patent
Kauerauf et al.

(10) Patent No.: US 10,127,365 B2
(45) Date of Patent: Nov. 13, 2018

(54) FIELD CONTROL ANNOTATIONS BASED ON AUTHORIZATION OBJECTS

(71) Applicant: SAP SE, Walldorf (DE)

(72) Inventors: Bernd Kauerauf, Heidelberg (DE); Nils Hartmann, Heidelberg (DE); Gregor Tielsch, Mannheim (DE)

(73) Assignee: SAP SE, Walldorf (DE)

( * ) Notice: Subject to any disclaimer, the term of this patent is extended or adjusted under 35 U.S.C. 154(b) by 107 days.

(21) Appl. No.: 15/133,210

(22) Filed: Apr. 19, 2016

(65) Prior Publication Data
US 2017/0300672 A1 Oct. 19, 2017

(51) Int. Cl.
*G06F 21/31* (2013.01)
*G06F 8/38* (2018.01)
*G06F 21/62* (2013.01)

(52) U.S. Cl.
CPC .............. *G06F 21/31* (2013.01); *G06F 8/38* (2013.01); *G06F 21/629* (2013.01); *G06F 21/6218* (2013.01)

(58) Field of Classification Search
CPC .......... G06F 21/31; G06F 21/629; G06F 8/38; G06F 21/6218
See application file for complete search history.

(56) References Cited

U.S. PATENT DOCUMENTS

| | | | |
|---|---|---|---|
| 7,703,021 B1* | 4/2010 | Flam | G06F 21/6227 715/741 |
| 9,280,788 B2* | 3/2016 | Ferrari | G06Q 30/0627 |
| 2015/0006135 A1* | 1/2015 | Deb | G06F 8/34 703/6 |
| 2015/0142852 A1* | 5/2015 | Lippert | G06F 21/6227 707/785 |
| 2015/0213552 A1* | 7/2015 | Silvano | G06Q 40/04 705/37 |

* cited by examiner

*Primary Examiner* — Izunna Okeke
*Assistant Examiner* — Cheng-Feng Huang
(74) *Attorney, Agent, or Firm* — Fish & Richardson P.C.

(57) ABSTRACT

An application scaffold is generated based on an object model. The object model includes CDS objects and DCL objects. The CDS objects and the DCL objects are evaluated together with corresponding CDS annotations and DCL annotations. Based on the evaluation, a field control hub is generated. The field control hub evaluates the DCL annotations and determines, based on one or more authorization objects from the DCL annotations, field control data for a field from a number of fields of a UI. When a user requests the UI, the field of the UI is displayed in accordance with the determined field control data for a role of the user.

9 Claims, 4 Drawing Sheets

FIELD CONTROL ANNOTATIONS BASED ON AUTHORIZATION OBJECTS

FIELD

Embodiments described herein generally relate to tools and techniques including processes and apparatus for operating a computer or digital data processing system that enables creation and management of computer program code. Further, described are tools and techniques for generation of source code by combining modules such as procedures or functions together to form a program.

BACKGROUND

Application development is typically simplified by defining structure of an application based on an underlying object model. The object model includes structures to create specific parts of the application including the application User Interface (UI). A further step of simplification is to encapsulate information of the object model in database related structures. For example, the object model information can be encapsulated in Core Data Services (CDS) objects. Generating the UI may require additional information such as a help value attached to each UI field. The help value defines data retrieval for the UI field. Such information is typically stored in CDS annotations that annotate the data retrieval via the CDS objects.

Further, authorizations for retrieval of data from a database are defined within the object model. In addition to the database access rights, field control access rights are required to apply authorizations to the UI. Field control access rights to the UI are included into the application via manual development that may be tiresome and error prone.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for field control annotations based on authorization objects are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Authorizations for data retrieval from a database are assigned to the CDS objects via Data Control Language (DCL) objects. The DCL objects define access rights to the data in the database on user level. At least one DCL object is associated to each CDS object that encapsulates object model data. The DCL object that corresponds to the CDS object defines authorizations for retrieval of data included in the CDS object from the database.

Figure 1:
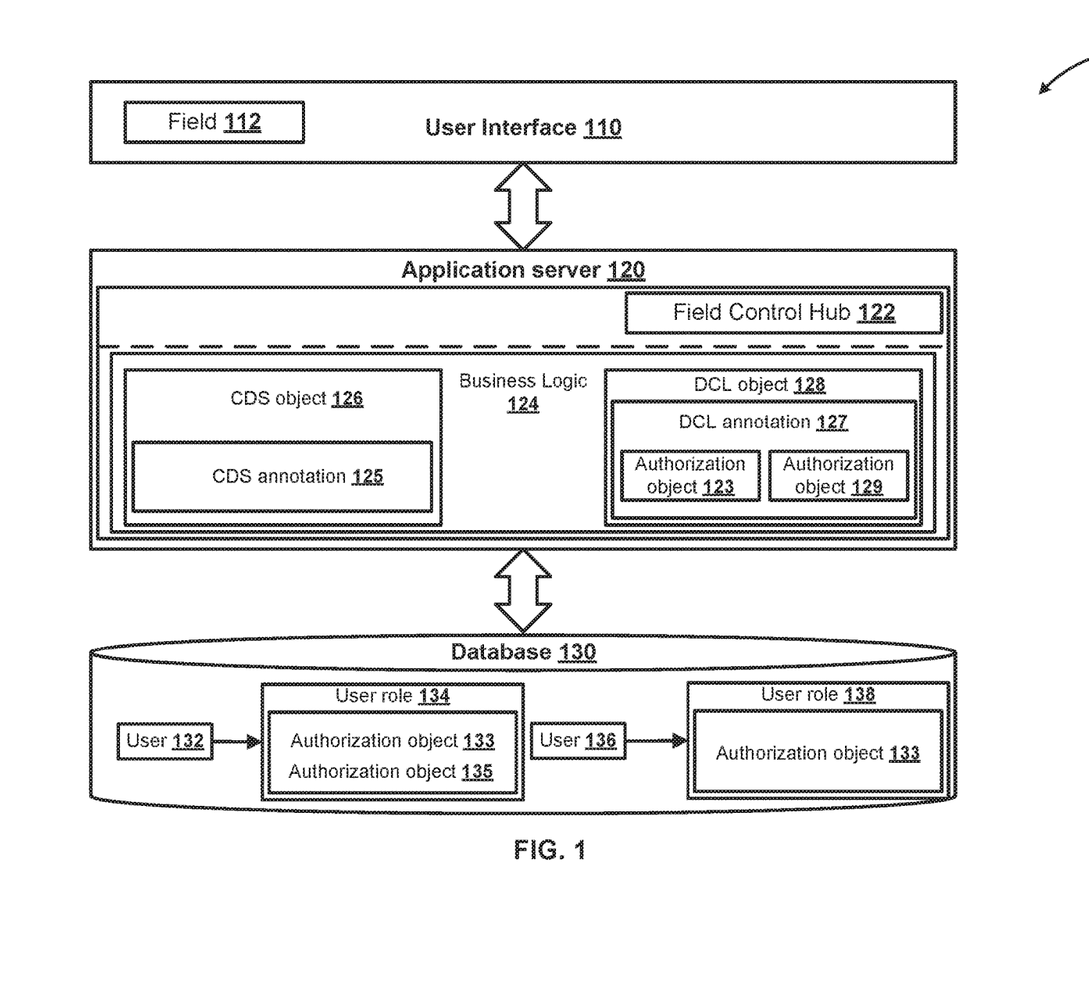
FIG. 1 is a block diagram illustrating an architectural structure of an application including DCL annotations, according to one embodiment.

FIG. 1 is a block diagram illustrating an architectural structure 100 of an application including DCL annotations, according to one embodiment. Architectural structure 100 includes user interface (UI) 110, application server 120 and database 130. Application server 120 represents a domain logic tier of a multi-tier architecture, according to one embodiment. Application server 120 executes applications and communicates with other system components such as presentation tier and data storage tier.

Further, application server 120 includes business logic 124 and field control hub 122. Field control hub 122 is generated based on business logic 124, together with UI 110. Business logic 124 represents an application object model. An application scaffold is created from the object model, according to one embodiment. Creating an application scaffold is a technique to specify interaction between an application executed by the domain logic tier and the data storage tier. The application scaffold specifies how data from database 130 is consumed. For example, the application scaffold may describe basic data operations such as create, read, update, and delete (CRUD). By creating the application scaffold, data interfaces of the application are automatically generated. Based on this specification of how data must be consumed, and based on evaluation of one or more pre-defined code templates, a compiler creates application code. In one embodiment, CDS object 126 and DCL object 128 of business logic 124 represent pre-defined code templates that are evaluated for the creation of the application scaffold. Such code templates are stored in database 130 and loaded in application server 120. For example, CDS object 126 and DCL object 128 may be loaded into application server 120 from database 130.

In one embodiment, field control hub 122 and UI 110 may be included in the application scaffold. Field control hub 122 is generated upon evaluation of CDS object 126 and DCL object 128 and deployed on application server 120. Field control hub 122 controls properties of UI components such as field 112. For example, field control hub 122 controls visibility of field 112. Based on permissions, field 112 may be visible for users with role "administrator" and invisible for users with role "guest". Field control hub 122 is configured to adjust properties of UI fields such as field 112 of UI 110, according to one embodiment. Field control huh 122 may be described as an entity that relates fields of UI 110 to corresponding data in database 130. Further, field control hub 110 supports displaying of fields of UI 110 based on permissions and data in database 130.

Business logic 124 may encode business rules and aspects determining how data is created, read, updated, and deleted (basic CRUD operations). The application scaffold may incorporate the basic CRUD operations encapsulated in CDS objects such as CDS object 126, according to one embodiment. Further, CDS object 126 may include one or more corresponding annotations such as CDS annotation 125. CDS annotation 125 may provide additional information for the generation of UI 110.

In one embodiment, a help value is assigned to field 112 of UI 110. The help value is associated with a help entity set (e.g., a help table in a database) and field 112 is associated with a field entity set (e.g., a field table in a database). An entity set defines data retrieval for a corresponding field and/or value. Therefore, data retrieval for the help value is defined by an entity set that is different from the field entity set. The help entity set that defines data retrieval for the corresponding help value is stored in CDS annotation 125.

In addition, business logic 124 includes a number of DCL objects such as DCL object 128. With respect to the application object model, CDS object 126 and DCL object 128 define additional features within UI 110, according to one embodiment. Besides data retrieval and corresponding CDS annotations, authorizations for data retrieval are defined. The authorizations are assigned to CDS object 126 via DCL object 128, according to one embodiment.

DCL objects restrict access to data in database 130 based on authorizations. For example, UI 110 may include a number of editable input fields such as field 112. DCL objects restrict unauthorized access to data in the database that is related to field 112. Although a restricted group of users that are given access rights may change value of field 112, all users that access UI 110 may see field 112 as editable. When a user enters data in field 112, a request to database 130 is sent. At database 130, it is determined whether the user has rights to make changes to the value of field 112, according to one embodiment. Thus, large number of unsuccessful requests to database 130 may be performed if a user is not authorized to change a field value and, therefore, system performance can be decreased.

The number of unsuccessful requests to database 130 may be reduced via DCL annotations. In one embodiment, DCL annotation 127 is included in DCL object 128. DCL annotation 127 includes one or more authorization objects, such as authorization object 123 and authorization object 129. An authorization object is composed of a set of fields. Values in the fields are examined in an authorization check. Via the authorization objects, it is determined whether the user is authorized to perform particular action, for example to change the value of field 112.

In one embodiment, DCL annotation 127 annotates field control data for field 112 of UI 110. Based on authorization objects included in DCL annotation 127 and based on the role of the user, field control data of field 112 is determined. For example, field control data of field 112 may include information whether field 112 is editable, visible, or mandatory for the user. One skilled in the art will recognize, however, that field control data may be determined for more UI components, in addition to a UI field. For example, field control data that is analyzed to determine access rights may be configured per a document or for a group of fields of the UI.

Authorization objects are included in user roles, according to one embodiment. For example, authorization object 133 and authorization object 135 are included in user role 134. A single authorization object may be related to one or more user roles. Similarly, a single user role may be related to one or more authorization objects. In one embodiment, authorization object 133 is included in both user role 134 and user role 138. For example, user 136 with user role 138 is authorized to view a document or a UI field; user 132 with user role 134 is authorized to modify the document or the UI field. Configuration of users associated with corresponding user roles is stored in database 130, according to one embodiment.

In one embodiment, CDS object 126 and DCL object 128 are evaluated, together with corresponding CDS annotation 125 and DCL annotation 127. Based on the evaluation of CDS object 126 and CDS annotation 125, UI 110 is generated. UI 110 is provided in response to a user request to access UI 110, according to one embodiment. Simultaneously, field control hub 122 is generated based on DCL objects such as DCL object 128. Field control hub evaluates DCL annotation 127 to determine properties of field 112, including field control data for field 112, according to one embodiment. During generation of UI 110, one or more authorization objects included in the role of the user are compared to authorization object 123 and authorization object 129 that are part of DCL annotation 127.

In one embodiment, user 132 requests UI 110. Based on authorization object 133 and 135 that are part of user role 134 of user 132, field control hub 122 determines field control data for field 112 of UI 110. Authorization object 123 and authorization object 129 represent references to authorization object 133 and authorization object 135 respectively, according to one embodiment. For example, user 132 may be associated with user role 134 with value "administrator". User role 134 "administrator" includes authorization object 133 with value "view" and authorization object 135 with value "edit". Therefore, upon evaluation of DCL annotation 127, field control hub 122 configures field control data for field 112 to "editable", among other properties of field 112. Thus, user 132 is provided with the options to view and edit field 112 of UI 110. In contrast, when user 136 with user role 138 (e.g., user role 138 with value "guest") requests UI 110, field control hub 122 configures field control data for field 112 to "visible", based on authorization object 133 included in user role 138 and based on authorization objects included in DCL annotation 127. Thus, user 136 is provided with the option to view field 112 of UI 110.

One skilled in the art will recognize, however, that the above described DCL objects and DCL annotations for determining field control data, among other field properties, may be employed in a number of aspects. For example, based on field control data, editing or viewing a document may be restricted, as well as a number of actions the user may be allowed to perform on a UI.

Figure 2:
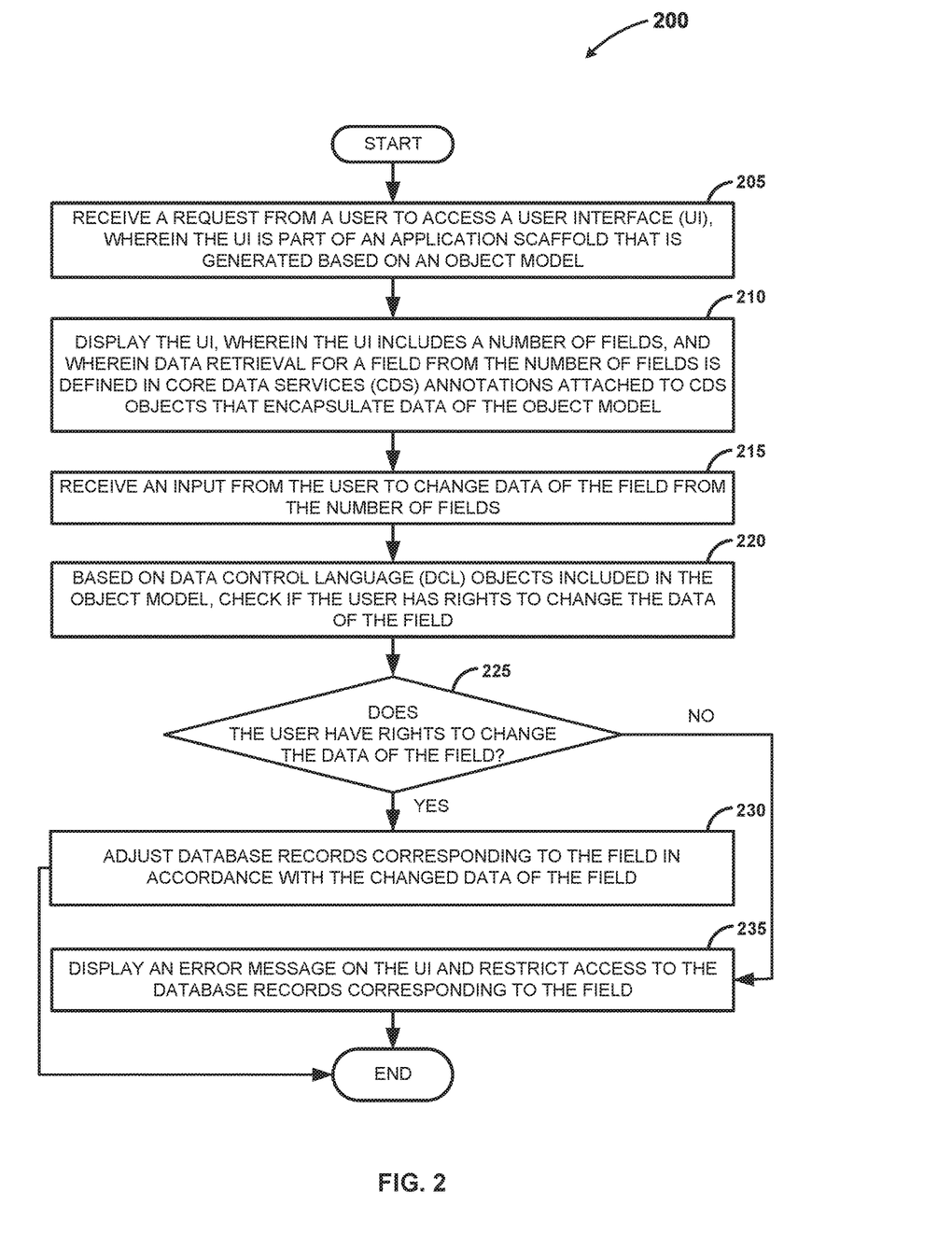
FIG. 2 is a flow diagram illustrating a process that automatically generates an application UI based on an underlying object model, according to one embodiment.

FIG. 2 is a flow diagram illustrating process 200 that automatically generates an application UI based on an underlying object model, according to one embodiment. The application UI is part of an application scaffold that is generated based on an underlying object model. Data of the object model is encapsulated in core data services (CDS) objects. The CDS objects define retrieval of the data from a database via a sequence of statements, according to one embodiment.

At 205, a user requests the application UI. Next, at 210, the UI associated with the application scaffold is displayed. The UI is displayed in response to the user request and includes a number of fields.

In one embodiment, retrieval of data for a field from the number of fields is defined by CDS annotations included in the CDS objects. For example, when a help value is configured to suggest relevant values for the field that can be selected by the user, the values may be provided by a help entity set (e.g., a help table in a database). At the same time, the field value may be retrieved from a field entity set (e.g., a field table in a database). Thus, information annotating the association between the entity sets and data retrieval from each entity set are included in one or more CDS annotations attached to the CDS objects.

At 215, an input to change data of the field is received from the user. For example, the user may edit the value of the field. The changed data of the field is transferred to the database as a request to edit data that is associated with the field. At 220, based on data control language (DCL) objects that are included in the object model, it is checked whether the user is authorized to change the data of the field. For example, determination may be performed based on the role of the user. Users are associated with user roles. Each user role aggregates one or more authorization objects. In one embodiment, authorization objects that are contained in the role of the user are compared with authorization objects included in the DCL objects to determine rights of the user. At 225, it is determined whether the user is authorized to edit data of the field. In one embodiment, it is determined that the user has no authorization to edit data of the field. Therefore, at 235, an error message is displayed on the UI. The error message is returned from the database. Further, access to data records in the database that correspond to the field is restricted. When it is determined that the user is authorized to edit data of the field, at 230, records in the database that correspond to the field are adjusted in accordance with the user input to edit data of the field.

Figure 3:
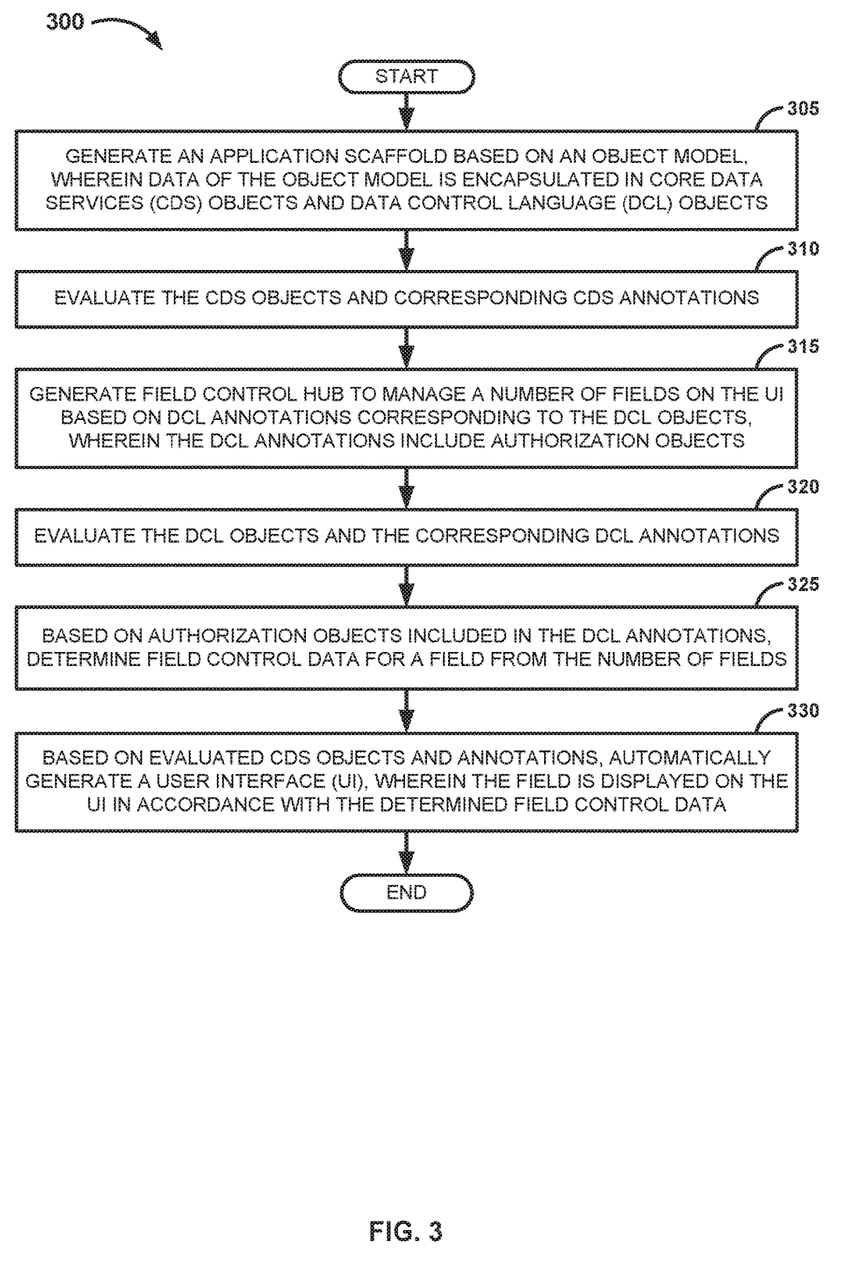
FIG. 3 is a flow diagram illustrating a process that automatically generates an application UI based on an underlying object model including DCL annotations, according to one embodiment.

FIG. 3 is a flow diagram illustrating process 300 that automatically generates an application UI based on an underlying object model including DCL annotations, according to one embodiment. One or more DCL annotations may be included in a DCL object similar to the DCL objects described with reference to FIG. Each DCL annotation may aggregate one or more authorization objects. For example, an authorization object that defines rights to view a field or a document of the application UI may be included in a DCL annotation. The process that automatically generates the application UI starts at 305, when an application scaffold is generated from an object model. The object model represents business objects, according to one embodiment. Data of the object model is encapsulated in database related structures such as core data services (CDS) objects and data control language (DCL) objects.

At 310, the CDS objects are evaluated. CDS objects define data retrieval for a number of fields of the application UI. At 315, the DCL objects are evaluated and a field control hub is generated. The field control hub is configured to manage field control data for a field from the number of fields of the application UI. The field control huh evaluates, at 320, DCL annotations that are included in the DCL objects. In one embodiment, the DCL annotations include authorization objects. Typically, user roles aggregate one or more authorization objects. The authorization objects define permissions associated with each user role from a hierarchy of user roles. For example, user role "administrator" may include authorization objects that define permission of a user with user role "administrator" to create, delete, and modify a field or a document accessible from the application UI.

At 325, field control data for the field from the number of fields of the application UI is determined. The field control data is determined based on the authorizations objects that are included in the DCL annotations. In one embodiment, the field control hub evaluates the DCL annotations and configures field control data for the field based on the evaluated DCL annotations. For example, upon determining that the role of the user includes an authorization object that defines a permission to "view" and "edit" the field, the field control hub may set the field control data of the field to "editable" for user with the corresponding user role.

Consequentially, at 330, the application UI is generated. The field is displayed on the application UI in accordance with the field control data that is determined by the field control hub based on the evaluated DCL annotations.

Described is a system and method to automatically manage a number of fields of a UI. An application scaffold is generated based on an object model. Data of the object model is encapsulated in CDS objects and corresponding DCL objects. The CDS objects and corresponding CDS annotations are evaluated. The CDS annotations define data retrieval for the number of fields of the UI. A field control hub is generated based on the DCL objects and corresponding DCL annotations. The DCL annotations include authorization objects. The DCL annotations are evaluated by the field control hub and field control data for a field from the number of fields is determined based on the authorization objects included in the DCL annotations. Authorization objects are aggregated in user roles.

By introducing DCL annotations with authorization objects definition of authorizations with direct consequences on a UI interaction scheme is enabled. With the above described setup additional aspects of a UI can be readily included in CDS and DCL layer such that more comprehensive UIs can be automatically generated by data stored in the CDS and DCL layer that is closely related to the database. Thus, application development is eased and accelerated.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
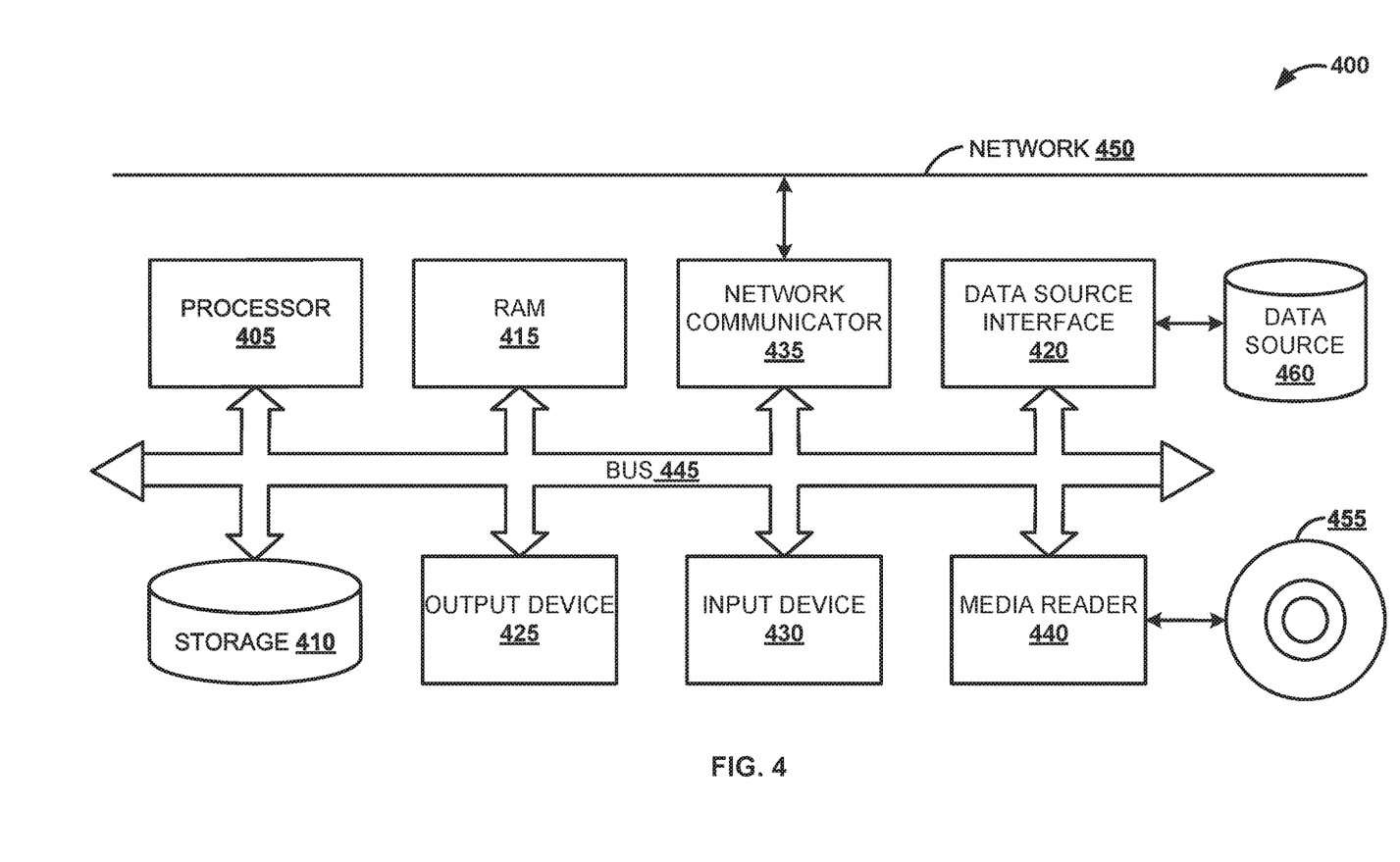
FIG. 4 is a block diagram of an exemplary computer system, according to one embodiment.

FIG. 4 is a block diagram of an exemplary computer system 400. The computer system 400 includes a processor 405 that executes software instructions or code stored on a computer readable storage medium 455 to perform the above-illustrated methods. The processor 405 can include a plurality of cores. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. According to some embodiments, such as some in-memory computing system embodiments, the RAM 415 can have sufficient storage capacity to store much of the data required for processing in the RAM 415 instead of in the storage 410. In some embodiments, all of the data required for processing may be stored in the RAM 415. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text tiles), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to automatically manage a plurality of User Interface (UI) components, the method comprising:

generating an application scaffold based on an object model, wherein the object model is encapsulated in a plurality of Core Data Services (CDS) objects and a plurality of Data Control Language (DCL) objects, and wherein a CDS object of the plurality of CDS objects is associated with a UI component of the plurality of UI components;

evaluating the CDS object and one or more CDS annotations corresponding to the CDS object, wherein the one or more CDS annotations define retrieval of data for the UI component from a database;

based on one or more DCL annotations corresponding to at least one DCL object of the plurality of DCL objects, generating a field control hub, wherein the at least one DCL object is associated with the CDS object to define authorizations for retrieval of the data for the UI component, and wherein the one or more DCL annotations comprise one or more authorization objects; and at an application server, the application server comprising a domain logic tier of a multi-tier architecture:

deploying the field control hub to control properties of the UI component at the application server;
comparing the one or more authorization objects with at least one authorization object assigned to a role of a user accessing the application server;
determining field control data of the UI component based on comparing the one or more authorization objects with the at least one authorization object, wherein determining field control data of the UI component based on comparing the one or more authorization objects with the at least one authorization object comprises:
  determining that the user is authorized to view and modify the UI component from the plurality of UI components, and configuring the field control data of the UI component as editable;
  determining that the user is authorized to view the UI component from the plurality of UI components, and configuring the field control data of the UI component as visible; and
  determining that the user is not authorized to view and modify the UI component from the plurality of UI components, and configuring the field control data of the UI component as invisible; and
upon determining the field control data of the UI component, automatically generating the UI to display the UI component from the plurality of UI components in accordance with the determined field control data.

2. The computer implemented method of claim 1 further comprising managing access to the database based on the role of the user.

3. The computer implemented method of claim 1 further comprising managing the field control data of the UI component via the field control hub.

4. A computer system to automatically manage a plurality of User Interface (UI) components, the system comprising:
  at least one processor and memory for executing program code, the program code comprising:
    an application server, the application server comprising a domain logic tier of a multi-tier architecture, that stores a plurality of Core Data Services (CDS) objects and a plurality of Data Control Language (DCL) objects, wherein a CDS object of the plurality of CDS objects corresponds to one or more CDS annotations and a DCL object of the plurality of DCL objects corresponds to one or more DCL annotations, and wherein the CDS object is associated with a UI component of the plurality of UI components;
    an application scaffold that comprises the UI, wherein the application scaffold is generated based on the plurality of CDS objects and the plurality of DCL objects, and wherein the DCL object is associated with the CDS object to define authorizations for retrieval of data for the UI component;
    a field control hub deployed on the application server to control properties of the UI component at the application server, the field control hub compares one or more authorization objects included in the one or more DCL annotations with at least one authorization object assigned to a role of a user accessing the application server and determines field control data of the UI component at the application server based on the comparison of the one or more authorization objects included in the one or more DCL annotations with at least one authorization object assigned to a role of a user, wherein the field control hub displays the UI component in accordance with the determined field control data on the UI, and wherein the field control hub is part of the application scaffold, wherein determining field control data of the UI component at the application server comprises at least one of determining that the user is authorized to view and modify the UI component from the plurality of UI components and configuring the field control data of the UI component as editable, determining that the user is authorized to view the UI component from the plurality of UI components and configuring the field control data of the UI component as visible and determining that the user is not authorized to view and modify the UI component from the plurality of UI components, and configuring the field control data of the UI component as invisible, and upon determining the field control data of the UI component, automatically generating the UI to display the UI component from the plurality of UI components in accordance with the determined field control data; and
  a database that stores data for the plurality of UI components, wherein retrieval of the data for the UI component from the database is defined by the one or more CDS annotations.

5. The computer system of claim 4, wherein CDS objects of the plurality of CDS objects comprise encapsulated object model data.

6. The computer system of claim 4, wherein DCL objects of the plurality of DCL objects control access to the database based on the role of the user.

7. A non-transitory computer readable medium storing instructions, which when executed by at least one processor cause a computer to perform operations comprising:
  generating an application scaffold based on an object model, wherein the object model is encapsulated in a plurality of Core Data Services (CDS) objects and a plurality of Data Control Language (DCL) objects, and wherein a CDS object of the plurality of CDS objects is associated with a UI component of a plurality of UI components;
  evaluating the CDS object and one or more CDS annotations corresponding to the CDS object, wherein the one or more CDS annotations define retrieval of data for the UI component from a database;
  based on one or more DCL annotations corresponding to at least one DCL object of the plurality of DCL objects, generating a field control hub, wherein the at least one DCL object is associated with the CDS object to define authorizations for retrieval of the data for the UI component, and wherein the one or more DCL annotations comprise one or more authorization objects; and
  at an application server, the application server comprising a domain logic tier of a multi-tier architecture:
    deploying the field control hub to control properties of the UI component at the application server;
    comparing the one or more authorization objects with at least one authorization object assigned to a role of a user accessing the application server; and
    determining field control data of the UI component based on comparing the one or more authorization objects with the at least one authorization object, wherein determining field control data of the UI component based on comparing the one or more authorization objects with the at least one authorization object comprises:

determining that the user is authorized to view and modify the UI component from the plurality of UI components, and configuring the field control data of the UI component as editable;

determining that the user is authorized to view the UI component from the plurality of UI components, and configuring the field control data of the UI component as visible; and determining that the user is not authorized to view and modify the UI component from the plurality of UI components, and configuring the field control data of the UI component as invisible; and upon determining the field control data of the UI component, automatically generating the UI to display the UI component from the plurality of UI components in accordance with the determined field control data.

8. The computer readable medium of claim 7 further comprising manage access to the database based on the role of the user.

9. The computer readable medium of claim 7 further comprising manage the field control data of the UI component via the field control hub.

* * * * *